Oct. 20, 1953     A. F. GRISSETT     2,655,763
FORESTRY TOOL FOR GIRDLING TREES
Filed Aug. 30, 1951     2 Sheets-Sheet 1
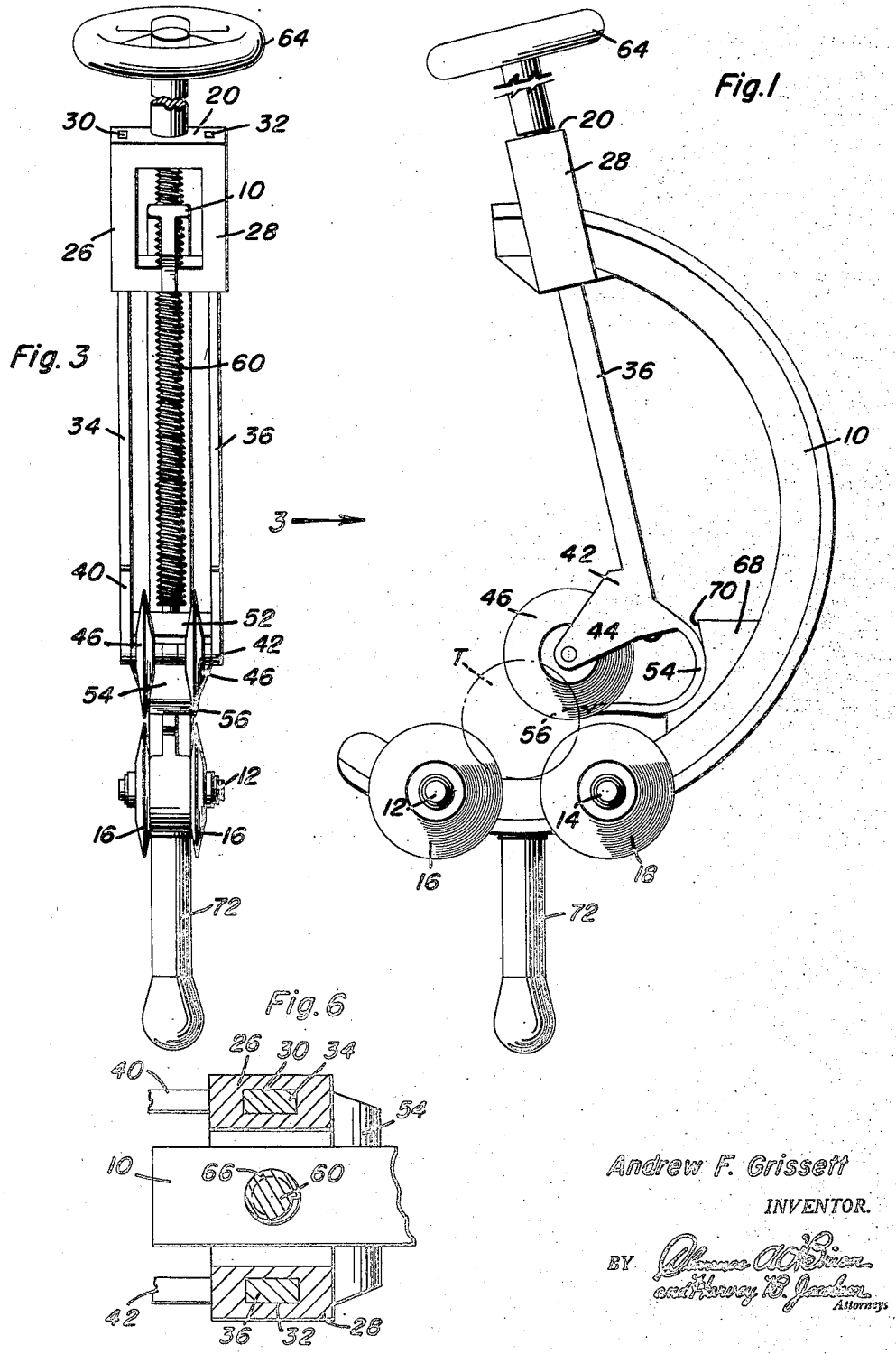
Andrew F. Grissett
INVENTOR.

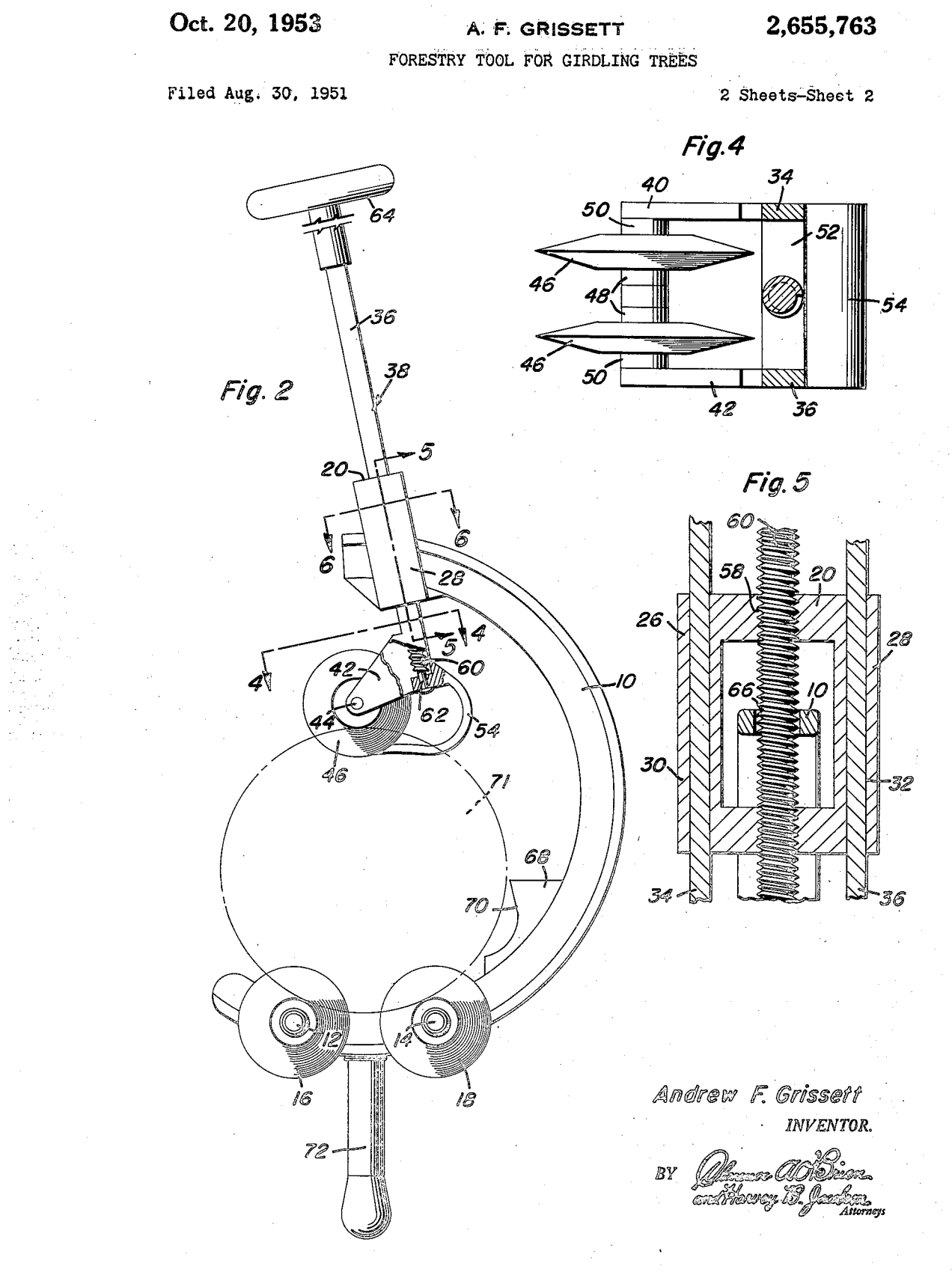

Oct. 20, 1953 A. F. GRISSETT 2,655,763
FORESTRY TOOL FOR GIRDLING TREES
Filed Aug. 30, 1951 2 Sheets-Sheet 2

Andrew F. Grissett
INVENTOR.

Patented Oct. 20, 1953

2,655,763

UNITED STATES PATENT OFFICE 2,655,763

FORESTRY TOOL FOR GIRDLING TREES

Andrew F. Grissett, Hattiesburg, Miss.

Application August 30, 1951, Serial No. 244,419

6 Claims. (Cl. 47—1)

This invention relates to new and useful improvements in forestry tools and the primary object of the present invention is to provide a tool for cutting and scraping a ring around a tree in order to kill the tree.

Another important object of the present invention is to provide a tree girdling tool including a frame that will embrace a tree and which comprises an adjustable blade holder, whereby the device may be employed on trees of various diameters.

A further object of the present invention is to provide a bark stripping, tree killing tool including a U-shaped frame having pairs of spaced cutting blades rotatably supported thereon so that as the frame is manually swung about a tree the blade will effectively cut a ring about the tree, which will be removed by a scraper supported on the frame.

A still further aim of the present invention is to provide a forestry tool that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the present invention adjusted to cut a small tree (shown by dotted lines);

Figure 2 is a view similar to Figure 1 but showing the invention adjusted to cut a larger tree (shown by dotted lines);

Figure 3 is a view taken in the direction of arrow numbered 3 in Figure 1;

Figure 4 is an enlarged sectional view taken substantially on the plane of section line 4—4 of Figure 2;

Figure 5 is an enlarged sectional view taken substantially on the plane of section line 5—5 of Figure 2; and, Figure 6 is an enlarged sectional view taken substantially on the plane of section line 6—6 of Figure 2.

Referring now to the drawings in detail, wherein for the purpose of illustration, there is disclosed a preferred embodiment of the present invention, the numeral 10 represents an arcuate or C-shaped frame that is T-shaped in cross-section to increase its strength.

One end of the frame 10 is formed with a pair of spaced apertures that receives shafts 12 and 14 carrying pairs of rotatable cutter blades or discs 16 and 18. Suitable spacers or washers are positioned on the shafts to space the cutters from the frame and the ends of the shafts.

The opening in a substantially rectangular guide or block 20 receives the other end of the frame 10 and the guide 20 is fixedly secured to the frame by webs or ribs 22 and 24. The side walls 26 and 28 of the guide 20 are formed with elongated bores or rectangular slots 30 and 32 that slidably receive a pair of rails 34 and 36 forming part of a blade holder or support 38.

One end of the support 38 is bifurcated since the rails 34 and 36 are provided with lateral projections or ears 40 and 42 that carry a shaft 44 on which there is mounted a pair of cutter blades or discs 46. Spacers 48 mounted on the shaft 44 space the discs 46 from each other and additional spacers 50 on the ends of the shaft 44 space the discs 46 from the ears 40 and 42.

The ears 40 and 42 are joined by a cross bar 52, rigidly secured to or forming an integral part of the ears. The bar 52 is formed with one end of an arcuate scraper arm 54 having a transverse beveled free edge 56 located between the discs 46.

An internally threaded axial bore 58 is formed in the guide 20 and receivably engages a feed worm or screw 60 one end of which is rotatably secured to the cross bar 52, as at 62. The other end of the screw 60 carries a hand wheel 64, whereby the screw may be rotated to move the discs 46 toward or away from the discs 16 and 18. The frame 10 is formed with an aperture 66 accommodating the screw 60.

A lug or seat member 68 is fixed by welding or the like to the frame 10 and includes a concave seat or recess 70 that opposes the arm 54 and which will be engaged by the arm 54 when the rails 34, 36 are adjusted toward the blades 16 and 18 for the cutting and stripping of relatively small diameter trees T, as shown in Figure 1.

The end of the frame 10 remote from the guide 20 rigidly supports a hand grip 72 that is disposed between the pairs of blades 16 and 18.

In practical use of the invention for cutting tree 71, larger than tree T, the frame 10 is positioned horizontally about the tree 71 and the hand grip 64 rotated to clamp the tree between the blades 16, 18 and 46. Then, the frame is rotated clockwise (Figures 1 and 2) to permit the blades to cut through the bark of the tree. The scraper 54 will remove the ring cut by the blades.

After this operation has been completed to cut the tree to a depth sufficient to kill the tree, the hand wheel 64 is backed up to permit removal of the frame.

The above procedure is likewise followed for killing trees T of small diameter, but the arm 54 will engage the wall of recess 70 to further steady the device.

Having described the invention, what is claimed as new is:

1. A forestry tool comprising a substantially U-shaped frame, cutter means supported on one end of the frame, a guide supported on the other end of the frame, a support slidably carried by the guide and selectively movable toward and away from the cutter means, a second cutter means carried by the support, means carried by and movable with the support and engaging the guide for adjusting the support relative to the first named cutter means, each of said cutter means comprising a pair of spaced parallel cutters, and a scraper blade attached to the support and having a sharp edge extending between the cutters of the second cutter means.

2. The combination of claim 1 wherein said support adjusting means includes a screw rotatably mounted on said support, said guide having a threaded opening receivably engaging said screw.

3. A forestry tool comprising a substantially U-shaped frame, cutter means supported on one end of the frame, a guide supported on the other end of the frame, a support slidably carried by the guide and selectively movable toward and away from the cutter means, a second cutter means carried by the support, and means carried by and movable with the support and engaging the guide for adjusting the support relative to the first named cutter means, said support including an arcuate scraper arm, and a retainer carried by the frame including a concave seat adapted to receive said arm when the second cutter means is disposed relatively close to the first named cutter means, whereby the tool may be employed on trees of relatively small diameters.

4. A device for cutting and scraping a ring around a tree through to the sap line, said device comprising an arcuate frame adapted to embrace a tree, pairs of spaced parallel cutter blades rotatably supported on one end of the frame, a guide fixed to the other end of the frame and having a pair of spaced parallel bores therein, a support including a pair of spaced parallel rails slidably received in said bores said support also including a bifurcated portion joining the rails at one of their ends, a shaft supported by the furcations, a pair of cutter blades mounted on the shaft, and a feed screw rotatably supported on the support and located between and in side by side relationship with said rails, said guide having an internally threaded opening paralleling said bores and receivably engaging said screw whereby the support may be manually adjusted relative to said first mentioned cutter blades.

5. A device for cutting and scraping a ring around a tree through to the sap line, said device comprising an arcuate frame adapted to embrace a tree, pairs of spaced parallel cutter blades rotatably supported on one end of the frame, a substantially rectangular open guide including a pair of end walls and a pair of side walls, said side walls joining said end walls, said side walls each having a longitudinal bore therein and said end walls each having an internally threaded aperture therein paralleling said bore and being located between said bores, a support including a pair of spaced parallel rails slidably received in the bores and a bifurcated portion joining the rails at one of their ends, a shaft rotatably supported on said bifurcated portion, cutter blades on said shaft, said guide including an opening in which the end of said frame remote from said first named blades is fixed, and a feed screw rotatably supported on said bifurcated portion and threaded in said apertures.

6. The combination of claim 5 and an arcuate retainer and gage member fixed to said bifurcated portion, and a rest fixed to the frame having a concave seat for the gage member.

ANDREW F. GRISSETT.

References Cited in the file of this patent

UNITED STATES PATENTS

| Number | Name | Date |
|---|---|---|
| 1,484,023 | Hayter | Feb. 19, 1924 |
| 1,814,763 | Neubauer | July 14, 1931 |
| 2,325,353 | Wright | July 27, 1943 |
| 2,456,882 | Mackey | Dec. 21, 1948 |

FOREIGN PATENTS

| Number | Country | Date |
|---|---|---|
| 21,764 | Australia | of 1929 |